US009479736B1

(12) United States Patent
Karakotsios

(10) Patent No.: US 9,479,736 B1
(45) Date of Patent: Oct. 25, 2016

(54) RENDERED AUDIOVISUAL COMMUNICATION

(71) Applicant: Amazon Technologies, Inc., Reno, NV (US)

(72) Inventor: Kenneth Mark Karakotsios, San Jose, CA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 14/810,336

(22) Filed: Jul. 27, 2015

Related U.S. Application Data

(63) Continuation of application No. 13/797,394, filed on Mar. 12, 2013, now Pat. No. 9,094,576.

(51) Int. Cl.
*H04N 7/14* (2006.01)
*H04N 7/15* (2006.01)
*G10L 15/26* (2006.01)
(Continued)

(52) U.S. Cl.
CPC .......... *H04N 7/157* (2013.01); *G06K 9/00302* (2013.01); *G10L 15/02* (2013.01); *G10L 15/26* (2013.01); *H04N 5/265* (2013.01); *G10L 2015/025* (2013.01)

(58) Field of Classification Search
CPC .. H04N 7/147; H04N 5/2647; H04N 5/2621; H04N 5/262; G06T 7/00; G06T 11/00; G06T 15/00; G06T 17/00; G06T 17/19; G06T 2200/16; G06T 2215/00
USPC ........... 348/14.01, 14.02, 14.07, 14.08, 14.1, 348/14.12, 14.14, 14.15; 704/270, 276, 704/256, 235, 258
See application file for complete search history.

(56) References Cited

U.S. PATENT DOCUMENTS 6,072,496 A * 6/2000 Guenter ............. G06K 9/00201
345/419
6,163,336 A 12/2000 Richards
(Continued)

FOREIGN PATENT DOCUMENTS

WO WO 2015/026902 2/2015

OTHER PUBLICATIONS

Author Unknown, "Faceshift Documentation: Faceshift Studio Beta", available at http://www.faceshift.com/help/studio/beta/, 2012, 12 pages.
(Continued)

*Primary Examiner* — Binh Tieu
(74) *Attorney, Agent, or Firm* — Polsinelli LP

(57) ABSTRACT

Systems and approaches are provided to allow for rendered audiovisual communication. An electronic device can be used to capture image information relating to physical features of a user. A model can be generated from the image information, and the model may be used to render audiovisual communication information from image and audio captured in real time. The rendered audiovisual communication data can simulate live video conferencing with substantial performance gains over conventional approaches to video conferencing. When the image capturing component of the electronic device is capable of depth imaging, stereo imaging, or other imaging techniques, the rendered audiovisual communication can be further enhanced with 3-D rendering of the user. Other aspects of audiovisual data, such as speech, background, and lighting conditions can also be rendered or synthesized to improve audiovisual communication.

17 Claims, 8 Drawing Sheets

(51) Int. Cl.
| | |
|---|---|
| H04N 5/265 | (2006.01) |
| G10L 15/02 | (2006.01) |
| G06K 9/00 | (2006.01) |

(56) References Cited

U.S. PATENT DOCUMENTS

| | | | |
|---|---|---|---|
| 6,249,763 B1 | 6/2001 | Minematsu | |
| 6,250,928 B1* | 6/2001 | Poggio | G09B 19/04 |
| | | | 345/473 |
| 6,301,370 B1 | 10/2001 | Steffens et al. | |
| 6,330,023 B1* | 12/2001 | Chen | H04N 21/4341 |
| | | | 348/14.13 |
| 6,539,354 B1* | 3/2003 | Sutton | G10L 21/06 |
| | | | 345/423 |
| 6,735,566 B1* | 5/2004 | Brand | G06K 9/6297 |
| | | | 345/473 |
| 6,864,912 B1 | 3/2005 | Mahaffey et al. | |
| 6,927,694 B1 | 8/2005 | Smith et al. | |
| 6,959,102 B2 | 10/2005 | Peck | |
| 7,092,554 B2 | 8/2006 | Chen et al. | |
| 7,168,953 B1* | 1/2007 | Poggio | G06T 13/205 |
| | | | 345/473 |
| 7,199,767 B2 | 4/2007 | Spero | |
| 7,515,173 B2 | 4/2009 | Zhang et al. | |
| 7,565,680 B1* | 7/2009 | Asmussen | H04N 7/147 |
| | | | 715/758 |
| 7,806,604 B2 | 10/2010 | Bazakos et al. | |
| 8,064,647 B2 | 11/2011 | Bazakos et al. | |
| 8,098,885 B2 | 1/2012 | Zhang et al. | |
| 8,385,610 B2 | 2/2013 | Corcoran et al. | |
| 8,644,565 B2 | 2/2014 | Du et al. | |
| 8,712,470 B2* | 4/2014 | Cho | H04M 1/72544 |
| | | | 345/173 |
| 8,725,507 B2* | 5/2014 | Cortez | G06T 13/205 |
| | | | 345/473 |
| 8,878,773 B1 | 11/2014 | Bozarth | |
| 8,942,434 B1 | 1/2015 | Karakotsios et al. | |
| 9,094,576 B1 | 7/2015 | Karakotsios | |
| 2003/0190076 A1 | 10/2003 | DeLean | |
| 2004/0107103 A1 | 6/2004 | Iyengar et al. | |
| 2004/0107106 A1* | 6/2004 | Margaliot | G10L 21/06 |
| | | | 704/270 |
| 2004/0174496 A1 | 9/2004 | Ji et al. | |
| 2004/0190759 A1 | 9/2004 | Caldwell | |
| 2005/0108162 A1* | 5/2005 | Sugihara | G06Q 20/102 |
| | | | 705/40 |
| 2005/0133693 A1 | 6/2005 | Fouquet et al. | |
| 2005/0175218 A1 | 8/2005 | Vertegaal et al. | |
| 2005/0207614 A1 | 9/2005 | Schonberg et al. | |
| 2006/0009978 A1* | 1/2006 | Ma | 704/266 |
| 2006/0038881 A1 | 2/2006 | Starkweather et al. | |
| 2006/0077347 A1 | 4/2006 | Liang et al. | |
| 2006/0109422 A1 | 5/2006 | Clark et al. | |
| 2006/0147094 A1 | 7/2006 | Yoo | |
| 2006/0210045 A1 | 9/2006 | Valliath et al. | |
| 2006/0256133 A1 | 11/2006 | Rosenberg | |
| 2006/0257026 A1 | 11/2006 | Shiffer et al. | |
| 2006/0269105 A1 | 11/2006 | Langlinais | |
| 2007/0025598 A1 | 2/2007 | Kobayashi et al. | |
| 2007/0064112 A1 | 3/2007 | Chatting et al. | |
| 2007/0189582 A1 | 8/2007 | Hamza et al. | |
| 2008/0123734 A1 | 5/2008 | Lin et al. | |
| 2008/0136895 A1* | 6/2008 | Mareachen | H04N 7/147 |
| | | | 348/14.03 |
| 2008/0151786 A1* | 6/2008 | Li | H04L 65/607 |
| | | | 370/276 |
| 2008/0158407 A1 | 7/2008 | Funamoto | |
| 2008/0167868 A1 | 7/2008 | Kanevsky et al. | |
| 2008/0170759 A1 | 7/2008 | Monro | |
| 2008/0253622 A1 | 10/2008 | Tosa et al. | |
| 2008/0291488 A1 | 11/2008 | Lin et al. | |
| 2008/0298571 A1 | 12/2008 | Kurtz et al. | |
| 2009/0110248 A1 | 4/2009 | Masuda et al. | |
| 2009/0115966 A1 | 5/2009 | Waldorf et al. | |
| 2009/0128499 A1 | 5/2009 | Izadi et al. | |
| 2010/0002912 A1 | 1/2010 | Solinsky | |
| 2010/0014718 A1 | 1/2010 | Savvides et al. | |
| 2010/0014720 A1 | 1/2010 | Hoyos et al. | |
| 2010/0103244 A1 | 4/2010 | Brandsma et al. | |
| 2010/0124941 A1 | 5/2010 | Cho | |
| 2010/0182325 A1* | 7/2010 | Cederwall | G06T 13/40 |
| | | | 345/473 |
| 2010/0188328 A1 | 7/2010 | Dodge et al. | |
| 2010/0188426 A1 | 7/2010 | Ohmori et al. | |
| 2010/0225743 A1 | 9/2010 | Florencio et al. | |
| 2010/0238323 A1 | 9/2010 | Englund et al. | |
| 2011/0026014 A1 | 2/2011 | Mack et al. | |
| 2011/0026609 A1 | 2/2011 | Sitrick | |
| 2011/0071830 A1 | 3/2011 | Kim et al. | |
| 2011/0128365 A1 | 6/2011 | Ren et al. | |
| 2011/0131041 A1* | 6/2011 | Cortez | G06T 13/205 |
| | | | 704/235 |
| 2011/0141436 A1 | 6/2011 | Ono | |
| 2011/0243388 A1 | 10/2011 | Sakaguchi et al. | |
| 2011/0254691 A1 | 10/2011 | Ooi et al. | |
| 2011/0304541 A1 | 12/2011 | Dalal | |
| 2011/0316853 A1 | 12/2011 | Bar-Zeev et al. | |
| 2012/0057064 A1 | 3/2012 | Gardiner et al. | |
| 2012/0075492 A1 | 3/2012 | Nanu et al. | |
| 2012/0114172 A1 | 5/2012 | Du et al. | |
| 2012/0131098 A1 | 5/2012 | Wood et al. | |
| 2012/0323581 A1* | 12/2012 | Strietzel | G06Q 30/0247 |
| | | | 704/276 |
| 2012/0327196 A1 | 12/2012 | Ohba et al. | |
| 2013/0021240 A1 | 1/2013 | Coulon | |
| 2013/0038609 A1 | 2/2013 | Tsai et al. | |
| 2013/0141643 A1* | 6/2013 | Carson | H04N 21/4307 |
| | | | 348/515 |
| 2013/0190054 A1 | 7/2013 | Kulas | |
| 2013/0257876 A1* | 10/2013 | Davis | G06T 13/80 |
| | | | 345/473 |
| 2013/0257877 A1* | 10/2013 | Davis | G06T 13/80 |
| | | | 345/473 |
| 2013/0293488 A1 | 11/2013 | Na et al. | |
| 2013/0293530 A1 | 11/2013 | Perez et al. | |
| 2013/0332160 A1 | 12/2013 | Posa | |
| 2014/0007019 A1 | 1/2014 | Saukko et al. | |
| 2014/0118346 A1 | 5/2014 | Tsai et al. | |
| 2014/0168074 A1 | 6/2014 | Lim et al. | |
| 2014/0232745 A1 | 8/2014 | Cho | |
| 2015/0055821 A1 | 2/2015 | Fotland | |

OTHER PUBLICATIONS

Cappelletta, Luca et al., "Phoneme-To-Viseme Mapping for Visual Speech Recognition", Department of Electronic and Electrical Engineering, Trinity College Dublin, Ireland, 2012, 8 pages.

Cornell, Jay, "Does This Headline Know You're Reading It?", h+Magazine, available at http://hplusmagazine.com/articles/ai/does-headline-know-you%E2%80%99re-reading-it, Mar. 19, 2010, 4 pages.

Van Den Berg, Thomas T., et al.,"Near Infrared Light Absorption in the Human Eye Media," Vision Res., vol. 37, No. 2, 1997, pp. 249-253.

PCT International Search Report and Written Opinion, mailed Dec. 18, 2014, for International Patent Application PCT/US2014/051817, 7 pages.

* cited by examiner

RENDERED AUDIOVISUAL COMMUNICATION

CROSS-REFERENCE TO RELATED APPLICATIONS

This application is a continuation of U.S. application Ser. No. 13/797,394, filed Mar. 12, 2013, entitled "RENDERED AUDIOVISUAL COMMUNICATION," which is hereby expressly incorporated herein by reference in its entirety.

BACKGROUND

As personal electronic devices become increasingly sophisticated, people are using such devices in new and interesting ways. While the earliest electronic communications may have been limited to transmission of electrical pulses representing dots and dashes along wires of finite distances, conventional electronic devices today provide for audio wireless communication between users located nearly anywhere in the world. Many conventional electronic devices are now even capable of enabling audiovisual communication or video conferencing between remote users. Although video conferencing is available for many conventional electronic devices, such functionality has yet to reach critical mass. One of the barriers to wider adoption may be that video conferencing can be resource intensive. For example, video conferencing can be cost prohibitive to both users and service providers because of the network and data bandwidth costs required to stream image and audio data in real time. In addition, audio and video capturing and streaming can consume inordinate amounts of processing, memory, and power. In other situations, video conferencing may not be a satisfying personal experience for some users. For instance, a user of a portable electronic device attempting to video conference typically holds his device at approximately a half arm's length below his chest such that a camera of the user's device captures the user's face at an upward angle, which can be an unflattering perspective for some users. In other cases, it may be difficult for some users to hold their devices steady, which can often result in shaky or jiggered video. Other user errors or environmental conditions such as poor lighting can also cause conventional video conferencing approaches to be a dissatisfying experience for users.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to enabling audiovisual communication between users of computing devices. In particular, various embodiments involve capturing image and audio data of a user, and rendering audiovisual information from a model of the user according to the captured data to approximate or simulate the video conferencing experience. In at least some embodiments, models can be generated from a training program that captures still images of certain user expressions and movement. In other embodiments, the models can be generated dynamically from machine learning. The models may be two-dimensional (2D) or three-dimensional (3D), and image or video data can be rendered from the 2D or 3D models for a 2D display (e.g., conventional televisions, computer monitors, or touchscreens) or a 3D display (e.g., 3-D glasses, goggles, headsets, helmets, a cave automatic virtual environment (CAVE), or other electronic devices capable of supporting 3D imaging).

In some embodiments, the rendered version of a user can be photorealistic and comprise a substantial likeness of the user. In other embodiments, the rendered version of a user can be a fictional avatar or a photorealistic avatar of another entity that mimics the user's voice and/or movement. Alternatively, or in addition, various embodiments also provide for synthesizing of audio data by adapting user speech to a different voice, dialect, or language from a speech synthesizer or model. For example, certain embodiments can incorporate a translation engine that automatically translates the speech of a user from one language to another language. Such embodiments may utilize a speech synthesizer or model of a native speaker to synthesize the translated speech, and lip movement of the user may be rendered to correspond to the translated speech. In other circumstances, a speech model can be used to replace a user's speech with synthesized speech from a speech synthesizer or model of a particular accent (or no accent). For instance, an American English speaker can have her speech synthesizer according to a speech synthesizer or model having a British English accent or a non-native speaker can have her speech synthesized according to a speech synthesizer or model having no accent. In still other embodiments, closed captioning can be provided as part of the rendered audiovisual communication. Various embodiments can also render or synthesize other visual and audio elements, such as lighting conditions or background noise and/or scenery.

Various other functions and advantages are described and suggested below in accordance with the various embodiments.

Figure 1A:
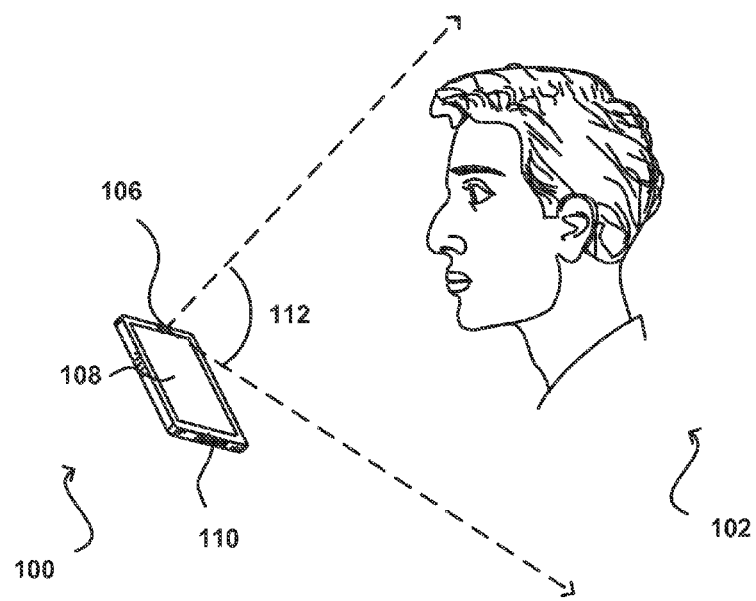
FIGS. 1A-1D illustrate examples of rendered audiovisual communication in accordance with various embodiments.

FIG. 1A illustrates an example of a user 102 operating computing device 100 for rendered audiovisual communication in accordance with various embodiments. Although a portable computing device (e.g., an electronic book reader or tablet computer) is shown, it should be understood that any device capable of receiving and processing input can be used in accordance with various embodiments discussed herein, where the devices can include, for example, desktop computers, notebook computers, personal data assistants, smart phones, video gaming consoles, television set top boxes, and portable media players. In this example, the computing device 100 has a display screen 108, which under normal operation will display information to a user facing the display screen (e.g., on the same side of the computing device as the display screen). The computing device 100 in this example includes an image capture element 106 positioned on the device such that at least a portion of a user, such as user 102, operating the computing device 100 is imaged by the image capture element 106. The image capture element 106 may be, for example, one or more cameras, charge-coupled devices (CCDs), motion detection sensors, infrared sensors, or some combination thereof, among many other possibilities. The computing device 100 also includes one or more microphones 110 or other audio capture devices capable of capturing audio data, such as words spoken by the user 102 of the device. In this example, the microphone 110 is placed on the same side of the device 100 as the display screen 108, such that the microphone 110 will typically be better able to capture words spoken by a user of the device. In at least some embodiments, the microphone can be a directional microphone that captures sound information from substantially directly in front of the device, and picks up only a limited amount of sound from other directions, which can help to better capture words spoken by a primary user of the device. In other embodiments, a computing device may include multiple microphones to capture 3D audio. In at least some embodiments, a computing device can also include an audio output element, such as internal speakers or one or more ports to support peripheral audio output devices, such as headphones or loudspeakers.

In the example of FIG. 1A, the imaging element 106 can be positioned so as to capture images of the user 102 when he is positioned substantially in front of the display screen 108, where the user 102 would typically be positioned to interact with the device 100. The imaging element 106 can include at least one camera or sensor with a lens having an angular field of view 112 such that image information can be captured of a user 102 as long as at least a portion of that user 102 is at least partially within that field of view 112. In order to detect certain expressions, motions, positions, or gestures, however, at least a minimum portion of one or more specific features of the user must be represented in the captured image information in order to enable the device (or software executing on or in communication with the device) to make the determination. In some embodiments, the imaging element 106 of the computing device 100 can include multiple cameras, including at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

In at least some embodiments, software executing on the computing device 100 attempts to determine the position, orientation, and movement of the user 102 in three-dimensional space. Such a determination can be performed using various types of configurations. For example, two-dimensional image information can be captured to determine certain direction and motion information using a conventional camera and the computing device can utilize structured lighting to obtain three-dimensional information by projecting a regular pattern of light (e.g., infrared (IR) light) and analyzing the changes in the reflected pattern due to three dimensional objects. In other embodiments, other approaches such as those used for motion capture can be implemented for monitoring the change in location of specific features during user movement. For example, in some embodiments, two-dimensional image capture can be enhanced using a distance sensor, range finders, ultrasonic transceiver, or other such device capable of providing distance information. In some embodiments, three-dimensional or stereoscopic image information can be captured using multiple cameras to provide three-dimensional point data, or disparity information that can be used to determine motion in three dimensions. Various other approaches can be utilized as well as should be apparent to one of ordinary skill in the art in light of the teachings and suggestions contained herein.

Figure 1B:
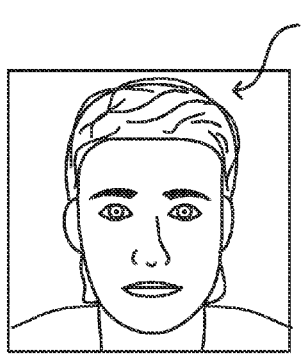
Figure 1C:
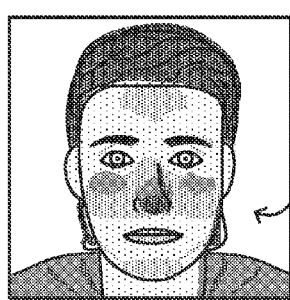
Figure 1D:
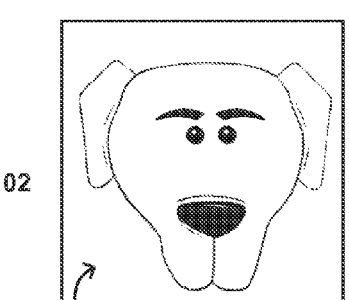

FIGS. 1B-1D illustrate examples of how a first user, such as user 102, may be visually presented to a second computing device (not shown) according to various embodiments. In the example of FIG. 1B, the image or video of the user 102 is based on a photorealistic 2D model and image data captured by imaging element 106 (from FIG. 1A) at an upward angle of the face of the user 102. Although FIG. 1B may appear to a user of second computing device to be a conventional image or video of the first user 102, in actuality, what is presented to the second computing device is a rendered perspective of the face of the first user 102 at eye level. If the image or video presented to the second user was a pixel-for-pixel match of the image capture component 106, as may be implemented according to conventional devices and/or techniques, the area between the first user's neck and chin and/or the inside of the first user's nostrils would be more prominently displayed because of the position of the image capturing component 106 (of FIG. 1A). However, such a perspective may be unflattering to some users, and instead, as depicted in FIG. 1B, an eye level rendering of the first user is provided to the second computing device. Various other advantages may be obtained by rendering image data from a model rather than streaming captured pixel data. For example, only a limited amount of image data may be acquired and streamed to another user when rendering from a model. Using conventional techniques, every pixel captured by an image capturing component may need to be streamed to the second user (such as on every key frame). Thus, rendering image data from a model can result in significantly less data and network usage than conventional video conferencing techniques. To the extent processing requirements are non-trivial, data can be offloaded to a separate system to perform the processing before being streamed to the second computing device for presentation. Other advantages of rendering image data from a model according to at least some embodiments can include avoiding user errors or undesirable environmental conditions, such as shaking and jiggering or insufficient lighting. Still other advantages include the capability of a user to utilize historical image data to render a more idealized version of the user. For instance, the user may prefer to have visual data rendered from historical image data if he is conducting a video conference much earlier than a time he is accustomed to waking or much later than his bedtime.

FIG. 1C is an example of 3D visual data generated from a model of the user 102 according to another embodiment. The shading depicted in FIG. 1C indicates depth information that was captured and rendered according to a 3D model of the user. FIG. 1C also depicts the view of the user 102 to be eye level as in FIG. 1B even though the image of the user is captured at an angle below the user's chin as depicted in FIG. 1A. The data for the 3D model can be acquired in various ways, including using multiple conventional cameras to capture stereo or 3D image data or using a conventional camera and various range imaging techniques to associate distance or depth of each pixel of each captured image. Such methods may include structured light reflection, time-of-flight techniques using radio frequency (RF) or light pulses, interferometry, and/or coded aperture. These depth imaging techniques are well known in the art and will not be discussed herein in detail. For instance, one implementation for generating a 3D facial model of a user is based on software for provided by faceshift AG of Zurich, Switzerland and a 3D sensor such as the Microsoft® Kinect®. The faceshift software and similar modeling software allow a user to create a 3D model or rig by capturing images of the user representing facial expressions such as a neutral expression, a smile, or a frown. After the 3D model or rig is generated, 3D facial modeling software can also provide for tracking and recording of user head movement and facial expressions, and the tracked data can be exported according to various formats. The Kinect® sensor and similar 3D or depth imaging sensors typically include one or more conventional cameras, IR emitters, and IR sensors. The IR emitter emits IR light beams and the complementary IR depth sensor reads the IR beams reflected back to the sensor to determine depth information measuring the distance between an object and the sensor. Conventional devices can also include an array of microphones for capturing sound from multiple directions and other motion sensors such as accelerometers, inertial sensors, electronic gyroscopes, electronic compasses, and GPS elements.

FIG. 1D is another example of rendered image or video data of the user 102 in accordance with an embodiment. In the example of FIG. 1D, the user 102 (or another authorized party) has chosen an avatar to represent himself when video conferencing with a user of a second computing device. Approaches for developing a 3D model or rig of a user avatar are not substantially different from a model or rig of a human user. Such techniques are well known in the art and will not be discussed herein in detail. For example, such techniques can be implemented using the faceshift software or similar 3D facial modeling software with a computing device capable of depth imaging. Although FIG. 1D depicts a non-human avatar, it will be appreciated that other avatars may include idealized or stylized versions (e.g., painterly, cartoon, cel animation) of the user or photorealistic avatars of other entities.

Figure 2A:
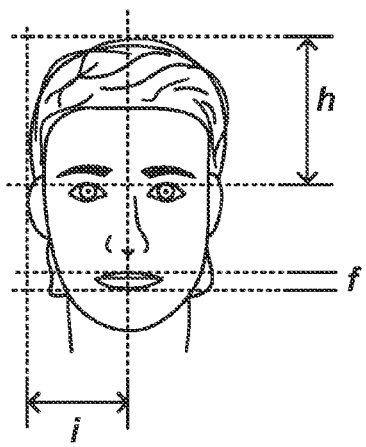
FIGS. 2A-2C illustrate examples of capturing user features in accordance with various embodiments.
Figure 2A:
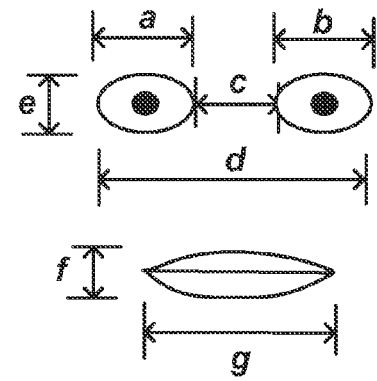

FIG. 2A illustrates an example wherein images are captured and analyzed to determine the relative positions of the user's head, eyes, and mouth. Such techniques can be used to generate a user model or to acquire image data to enable rendering of visual data in accordance with certain embodiments. In other embodiments, additional or alternative user facial features are tracked, such as the user's hairline, forehead, brow lines, eye brows, nose, cheeks, chin, neck, ears, upper lip, lower lip, teeth, tongue, etc. In general, tracking motion of more user features can more effectively bridge the realism gap, i.e., more accurately model user facial expressions and speech. But it will be appreciated that tracking additional features can also result in additional processing requirements, and systems are preferably designed to capture a suitable number of features to enable streaming of audiovisual data in substantially real time.

Figure 2B:
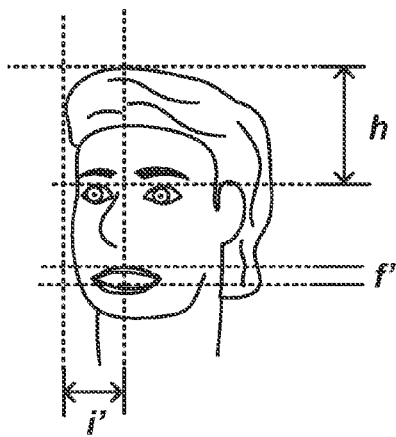
Figure 2B:
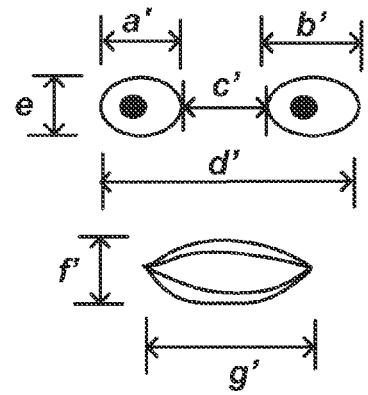
Figure 2C:
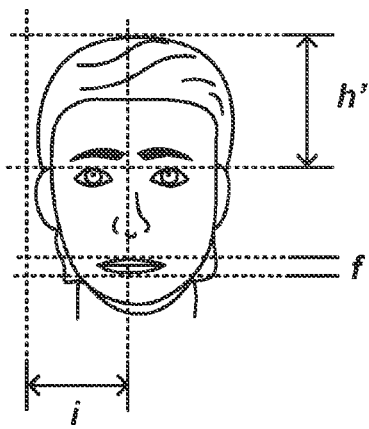
Figure 2C:
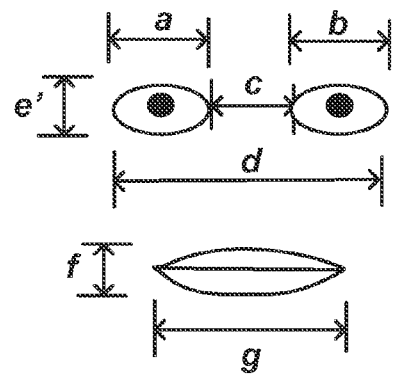

FIG. 2B illustrates a case where the user is turning his head and looking "left" (or to the user's right"), such that a center point of each user's pupil is to the left (in the image) of the center point of the respective eye. Similarly, FIG. 2C illustrates a case where the user turns his head upward and is looking "up". As can also be seen, the positions of the pupils have moved above a center point of the eyes. Various embodiments can track head movement and pupil movement to render corresponding visual data. In some embodiments, the position of the pupils can change without the user moving his or her head. Thus, in some embodiments, certain facial expressions can be detected without a change in head position or movement of other facial features. Approaches for determining pupil position are discussed in co-pending U.S. patent application Ser. No. 13/332,128, filed Dec. 20, 2011, entitled "Conflict Resolution for Pupil Detection," which is hereby incorporated by reference herein.

Figure 3A:
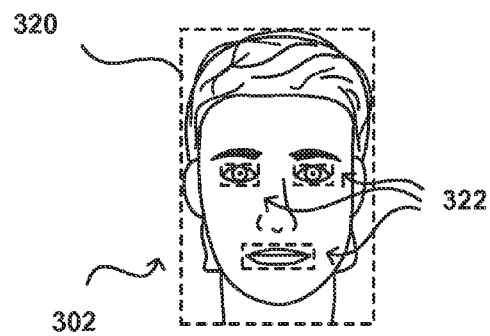
FIGS. 3A-3F illustrate examples of capturing user features in accordance with various embodiments.

Certain approaches can be utilized for determining various features of a user for image or video rendering. For example, if a user's head is to be used as input, there can be many objects that can be shaped similar to a human head that could give false readings. Also, a user nodding "no" might not actually move the position of the user's head enough to register the movement. Accordingly, various approaches utilize features such as a user's eyes, mouth, or other features to assist in position and movement determination. For example, an image can be analyzed to determine the approximate location and size of a user's head or face. FIG. 3A illustrates an example wherein the approximate position and area of a user's head or face 302 is determined and a virtual "box" 320 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 322 of each of the user's eyes (or in some cases the eyes in tandem) and mouth or other facial features. By determining the location of the user's eyes and mouth as well, advantages can be obtained as it can be more likely that the image determined to be the user's head actually includes the user's head, and it can be determined that the user is facing the device. Further, the relative movement of the user's eyes and mouth can be easier to detect than the overall movement of the user's head when performing motions such as nodding or shaking the head back and forth.

Figure 3B:
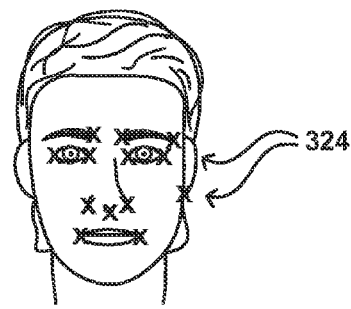

Various other algorithms can be used to determine the location of features on a user's face. For example, FIG. 3B illustrates an example wherein various features on a user's face are identified and assigned a point location 324 in the image. The system thus can detect various aspects of user facial features and can determine changes such as movement or change in shape or expression. Such an approach provides advantages over the general approach of FIG. 3A in certain situations, as various points along a feature can be determined, such as the end points and at least one center point of a user's mouth. Accordingly, expressions such as a smile or frown can be captured even though the overall position of the user's mouth or face did not move.

Figure 3C:
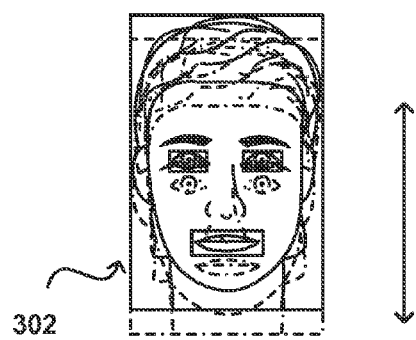
Figure 3D:
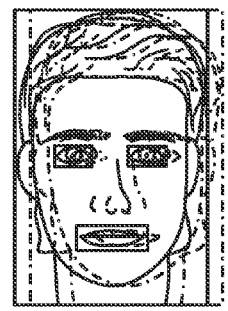
Figure 3E:
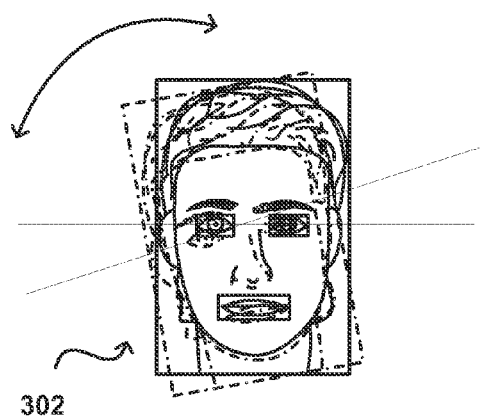

Once the facial features of a user are identified, relative motion or changes in facial expression can be detected and utilized as input in accordance with various embodiments. For example, FIG. 3C illustrates an example where the user's head 302 is moving up and down with respect to the viewable area of the imaging element. As discussed, this could be the result of the user shaking his or her head, or the user moving the device up and down, etc. FIG. 3D illustrates a similar example wherein the user is moving right to left relative to the device, through movement of the user, the device, or both. As can be seen, each movement can be tracked as a vertical or horizontal movement, respectively, and each can be treated differently as an input to perform a specified function. As should be understood, various embodiments also can detect diagonal or other such movements. FIG. 3E further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted as input.

Figure 3F:

FIG. 3F illustrates another advantage of using an approach such as that described with respect to FIG. 3B to determine the position of various features on a user's face. In this example, it can be seen that the features of a second user's head 303 have a different relative position and separation. Thus, the device also can not only determine positions and changes of facial features for a specific user, but can distinguish between different users. As discussed later herein, this can allow the device to generate or use different models of different users. Also, the device can be configured to detect how close a user is to the device based on, for example, the amount and ratio of separation of various features, such that the device can detect movement towards, and away from, the device. This can help to improve the accuracy of facial expression tracking.

In some embodiments, a computing device can determine and track approximate areas or regions of interest corresponding to the user's eyebrows, eyes, and mouth, or other such features, in the captured images such that an algorithm of the computing device only has to analyze image data corresponding to such regions, which can significantly reduce the amount of processing needed for images, particularly for high resolution, full color images.

A number of other approaches can be used as well within the scope of the various embodiments. For example, thermal imaging or another such approach could be used to attempt to determine and track the position of at least some aspect of a human user. In many instances the imaging system is desired to be small and inexpensive enough for mass marketing, such that simple or conventional imaging approaches and components can be preferred. Certain existing cameras can detect infrared radiation, but typically utilize an IR filter. Utilizing these cameras without the IR filter, and potentially with an ambient light filter, can allow these relatively inexpensive cameras to be used as IR detectors.

As discussed, a single wavelength of infrared radiation can be used in various embodiments to capture depth or distance information for user features. In other embodiments, at least two different wavelengths are used to capture image information in order to get more information about the user, as well as to make it harder to fool the recognition process. In one embodiment, a single detector is used to detect radiation reflected at two different wavelengths. As an example, a first LED could emit radiation at a wavelength (e.g., 940 nm) that is reflected by the retina, and a second LED could emit radiation at a wavelength (e.g., 1100 nm) that is absorbed by the cornea and/or other portions of the human eye. Specific wavelengths can be selected within selected wavelength ranges, based at least in part upon their reflective properties with respect to the human eye. For example, experiments indicate that light has less than a 50% absorption rate (for the typical human eye) under about 940 nm, above 50% absorption between about 940 nm and about 1030 nm, around 50% absorption for wavelengths between about 1040 nm and about 1100 nm, and about 100% absorption at 1150 nm and above. Thus, emitters can be selected that fall within at least some of these ranges, such as a first IR emitter that has significantly less that 50% absorption and a second IR emitter that has significantly greater than 50% absorption. The specific wavelengths can further be based, in at least some embodiments, upon the wavelengths of available devices. For example, an available laser diode at 904 nm can be selected that has a relatively low absorption rate, and an available laser diode at 980 nm or 1064 nm can be selected that has a relatively high absorption rate. In some embodiments, the power output of the higher wavelength diode can be scaled up to substantially match the perceived brightness of the lower wavelength diode by a CMOS sensor (or other such detector), the sensitivity of which might fall off to around zero at a value of about 1100 nm, such that in at least one embodiment the two emitters have wavelengths of 910 nm and 970 nm).

An advantage to using two wavelengths is that the LEDs can emit the radiation simultaneously, as long as a resulting image is able to be decomposed in order to extract image information corresponding to each wavelength. Various approaches for decomposing such an image are discussed elsewhere herein. The LEDs then could both be positioned near the camera, or a single LED or emitter can be used near the camera if that LED operates at (at least) the two frequencies of interest. Further information about the use of multiple emitters, detectors, and/or wavelengths can be found, for example, in co-pending U.S. patent application Ser. No. 12/786,297, filed May 24, 2010, entitled "Determining Relative Motion as Input," which is hereby incorporated herein by reference for all purposes.

When performing iris recognition, for example, a device might utilize IR in the 750 nm-950 nm range in order to avoid light reflections from the cornea, which can potentially create noise in the captured image information. A second wavelength might be used to determine relative absorption to ensure the image information corresponds to a human eye, as discussed above. In one example, the location of various user facial features can be determining using any appropriate process, such as those discussed above with respect to FIGS. 3A-3(f). The ability to locate particular regions of the user's face enables the more complex facial expression recognition processing to be performed on a smaller data set, thus reducing the amount of resources needed and producing faster results.

Various embodiments also employ speech recognition techniques to enhance audiovisual communication. For example, rendering of the user's mouth can be improved by recording and analyzing speech and correlating with image analysis to attempt to come to a consensus of the user's lip movement. In other embodiments, an algorithm might attempt to analyze the speech input first, as audio analysis can be significantly less resource intensive than analyzing streaming video capture. In such an embodiment, the algorithm might only analyze a portion of the video input when the speech recognition cannot analyze one or more words within at least an allowable degree of certainty. For example, a user might utter a phrase such as, "A word to the wise." The device might be unable to determine, within an acceptable degree of certainty, whether the user said "word" or "weird." In such an instance, the device can analyze the corresponding portion of the video, to enable such analysis. A person typically makes substantially different lip movements to form each word, making a relatively round shape to make the "o" in "word" while stretching the lips to pronounce the "ei" in weird. By analyzing the shape and/or movement of the user's lips around the time the word was pronounced, based on the captured images or video, the device can increase the level of certainty that the user actually said "word" or render the user's lip movement appropriately. Alternatively, or in addition, speech recognition techniques can also be used to provide closed captioning and/or other text or image data corresponding to user speech. The user's speech may be converted to text, and the text may be included in the streamed audiovisual data of the user. The speech may also be translated to various other languages in certain embodiments.

In at least some embodiments, the user model can be "trained" by correlating phonemes to visemes according to the phonology of a particular language. Phonemes can be thought of as the basic units or building blocks of a language, which when combined with one another can form meaningful units such as words. Visemes can be understood to be a visual representation, e.g., facial and oral position and movement, corresponding to one or more phonemes. A phonology can refer to a system of sounds of a language. Academic studies estimate that there are approximately 40-50 American English phonemes that correspond to an even smaller number of visemes. For example, \b\ and \p\ are phonetically different from one another and may comprise two separate phonemes, but the lip movement used to utter these two letters are visually similar such that they can be represented as a single viseme. Thus, in one embodiment, the user can be directed to "train" his facial model by enunciating a finite number of words or sounds. A single image is captured for each word or sound and mapped to a viseme. And the phoneme to viseme mapping can be used to render facial expressions corresponding to the user's speech. Table 1 illustrates one example of a phoneme to viseme mapping.

TABLE 1

Phoneme to Viseme Mapping

| Viseme | Visibility Rank | Occurrence [%] | Phonemes |
|---|---|---|---|
| /A | 1 | 3.15 | /f/ /v/ |
| /B | 2 | 15.49 | /er/ow/ /r/ /q/ /w/ /uh/ /uw/ /axr/ /ux/ |
| /C | 3 | 5.88 | /b/ /p/ /m/ /em/ |
| /D | 4 | .70 | /aw/ |
| /E | 5 | 2.90 | /dh/ /th/ |
| /F | 6 | 1.20 | /ch/ /jh/ /sh/ /zh/ |
| /G | 7 | 1.81 | /oy/ /ao/ |
| /H | 8 | 4.36 | /s/ /z/ |
| /I | 9 | 31.46 | /aa/ /ah/ /ay/ /eh/ /ey/ /ih/ /iy/ /y/ |
| /J | 10 | 21.10 | /ae/ /ax-h/ /ax/ /ix/ /d/ /l/ /n/ /t/ /el/ /nx/ /en/ /dx/ |
| /K | 11 | 4.84 | /g/ /k/ /ng/ /eng/ |
| /S | | | /sil/ /hh/ /hv/ |

Source: L. Cappelletta and N. Harte, "Phoneme-to-Viseme Mapping for Visual Speech Recognition." *ICPRAM2012* (2012).

The mapping groups 53 phonemes of the English language into 12 visemes, labeled from /A to /S. Table 1 also shows the viseme visibility and occurrence rate in spoken English according to L. Cappelletta and N. Harte, "Phoneme-to-Viseme Mapping for Visual Speech Recognition." ICPRAM2012 (2012). In one embodiment incorporating a translation engine, the user's speech can be automatically translated from one language and output aloud in a different language. Accordingly, phoneme to viseme mappings can be generated for additional languages and used to correlate suitable image data with translated audio data. One of the advantages of such embodiments over conventional approaches to audiovisual communication is that the user's mouth can be rendered to correlate with translated speech using an appropriate phoneme to viseme mapping. Thus, the dubbing effect where the user's lips do not correlate to speech can be eliminated in accordance with such an embodiment. In another embodiment, the user's speech can be replaced with a different voice to incorporate or remove certain accents. In still other embodiments, image or video data of an artificial user can be rendered from a model and the speech of the artificial user can be synthesized using a speech model or synthesizer based on previously generated text or dynamically generated text derived from various artificial intelligence processes. In various embodiments, speech synthesis can be based on a concatenative approach, such as unit selection, diphone, or domain-specific synthesis or a formant approach, such as by using a speech model. Other known approaches for speech synthesis or modeling include articulatory synthesis, synthesis based on hidden Markov models, and sinewave synthesis, which are known in the art and will not be discussed herein in detail.

In other embodiments, no speech recognition "training" is required. Instead, a machine learning algorithm is used to track utterances of certain words or sounds and corresponding images of a particular user's mouth are stored for the phoneme to viseme mapping until a complete mapping has been generated for the user. In at least some of these embodiments, visual tracking of the user's mouth can be limited to reduce processing requirements, and rendering of the mouth may be based primarily on speech recognition analysis. The ability to improve accuracy by combining multiple types of input can also be beneficial in other ways as well, as a user may no longer have to go through the speech recognition "training" program as is typical for conventional speech analysis programs. In many conventional approaches, the user must speak a long list of words containing different sounds, which is used to build a user-specific speech model that includes information for various pronunciation or inflection aspects of the user's speech. Users often do not enjoy this process, and may not use such approaches with devices such as portable media players or video games where the user wants to begin using the device immediately. Enabling input to be provided with less precision by reducing the likelihood of improper speech determination can enable general models to be used for speech input, such that users can begin using the device with little to no initial training or setup. Further, the device in some embodiments can analyze the user's speech over time to develop a user-specific speech model that can include information that is otherwise obtained in conventional systems using the training program.

In addition to techniques for facial expression recognition, at least some embodiments also capture and recognize other user types of user features and/or movement using motion capture techniques or similar approaches. In the example illustrated in FIG. 4A, such a system might determine the relative positions of a shoulder point 430, hand point 432, elbow point 432, hip point 436, knee point 438, and foot point 440 to determine how the user 402 is oriented at various moments in time. It will be appreciated that fewer or more points can be tracked to determine user position and orientation in other embodiments. For example, some embodiments track only the aforementioned or fewer points, while more complex systems might attempt to track every joint of the user's body. In yet other embodiments, certain user features will be tracked more generally while other features may include more track points. For instance, in an embodiment desiring to capture detailed information of a user's hand and general information about the user's head, every finger knuckle and multiple wrist points but a single point for the user's head can be determined.

The model/rig or skeleton data of the user's body can also be used to determine how to render one or more image items with respect to a view of the user. As discussed, two-dimensional image data can be computationally expensive to analyze, particularly to determine three-dimensional information. In order to determine the relative positions of a user's appendages for purposes of rendering clothing or other items thereon, the model or rig can provide a faster and potentially more accurate description of those relative positions. For example, the legs of a pair of pants can be rendered to remain substantially centered around the skeletal representation of the user's legs. The points at which the arms and legs bend also can quickly be determined from the skeletal information, which can be useful when attempting to determine how to render an image of an item for a current orientation of the user.

Figure 4A:
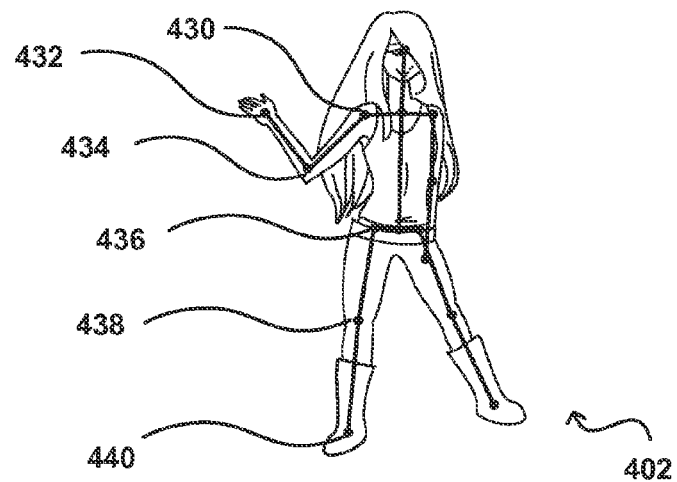
FIGS. 4A-4B illustrate examples of capturing user features and modifying user models in accordance with various embodiments.

In order to provide more accurate views, a rendering engine can also utilize the shape of the user 402 as determined from video or other such image information. For example, the skeletal information 430-440 can be used to quickly determine movements and positions, but the image information can provide a more accurate view of the shape of the user's body for the purpose of rendering the clothing to appear as if the user is actually wearing the clothing. As mentioned, this can include stretching, compressing, skewing, or otherwise modifying one or more portions of an item image in order to cause that item image to be shaped according to the specific user and user pose. In the example of FIG. 4A, the information would be used to render a top with one arm extended and pants with the legs spread somewhat apart, in order to match the orientation of the user's body. The information also can be used to adjust a rendering of the clothing items to substantially correspond to the outline of the user's body in order to make the image more realistic and appear as if the user is actually wearing those items.

Figure 4B:
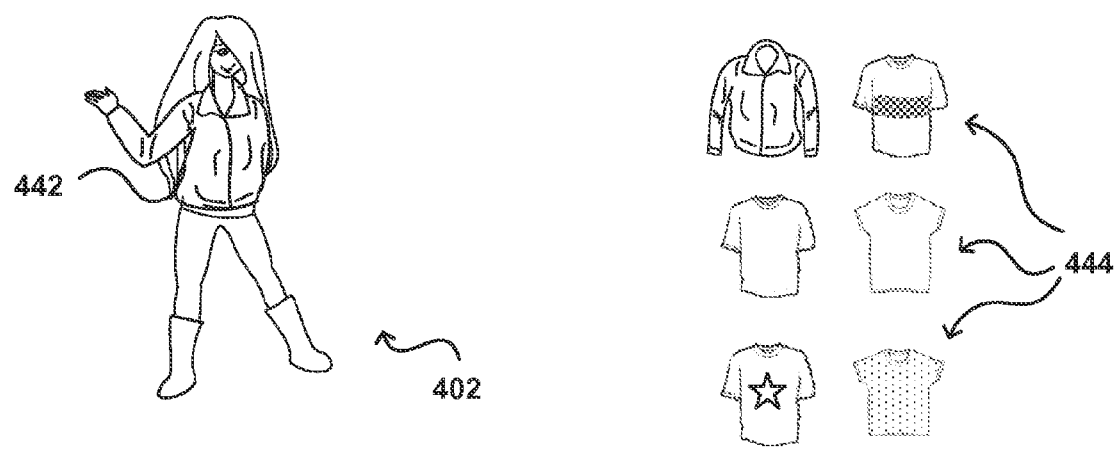

In addition to determining the orientation and shape of the user, a system or service can also analyze data for a clothing item in order to be able to render a view of that item that corresponds to the determined orientation and shape. Approaches discussed herein can also render or simulate image information for various clothing items such that the view of the user can appear to "wear" those items, where the rendering of the items substantially corresponds to the shape of the user as represented in FIG. 4B. In the example of FIG. 4B, the user 402 has selected to be displayed as wearing a jacket 442. The arm of the selected jacket 442 can be rendered to substantially match the position of the user's arm in the view. A main portion of the clothing item image can be stretched, compressed, or otherwise rendered to substantially correspond to the user's torso, in order to provide a view of what the item would actually look like if worn by the user 402.

Such an approach can enable a user to virtually try on different clothing items and combinations of clothing items. For example, FIG. 4B further illustrates a wardrobe with various clothing items 444 that can be used by the user 402 to adjust her appearance. Further, although only shirts are shown in this example, the user can also select belts, hats, jewelry, watches, purses, tattoo designs, hairstyles, hair color, eye color, skin color, other physical characteristics, and other such subject matter as well within the scope of the various embodiments. In order to facilitate analysis and/or rendering of clothing items or other physical characteristics of the user, the clothing items and other physical characteristics can be displayed in an image with a transparent background or background that can relatively easily be removed from the image. In some embodiments, three-dimensional model information might be available such that the clothing or other physical characteristics can be rendered, texture-mapped, shaded, or otherwise processed to correspond to the determined shape and orientation. Various other processes can be used as well as known in the visual arts for mapping clothing items to the shape of a user or modifying physical characteristics of the user.

Certain items may not be able to be properly placed and/or rendered using the skeletal and shape information alone, however. For example, sunglasses and hats may need to be positioned with specific orientations and positions that cannot readily be obtained from skeletal information, unless the information includes information such as eye position, chin position, and the like. Similarly, unless the outline of the user's shape includes the outline of specific features within the view of the user's body, additional analysis and/or processing may need to occur to provide for an appropriate rendering of such subject matter. To the extent automatic image processing techniques are not suitable for rendering these types of items, certain embodiments may enable the user to manually position items that cannot be automatically positioned and image processing techniques can be used to detect relative motion of the items to render them for the audiovisual data representing the user.

Figure 5A:
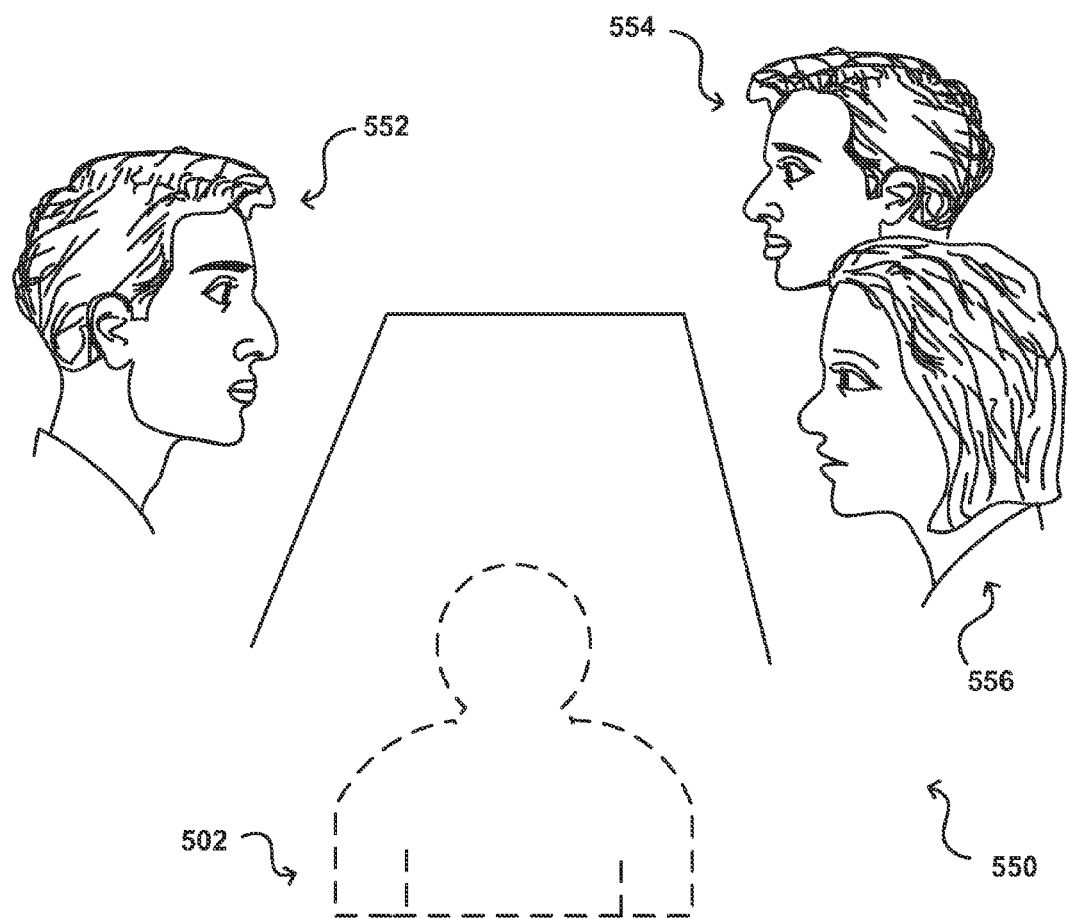
FIGS. 5A-5B examples of rendered audiovisual communication in accordance with an embodiment.
Figure 5B:
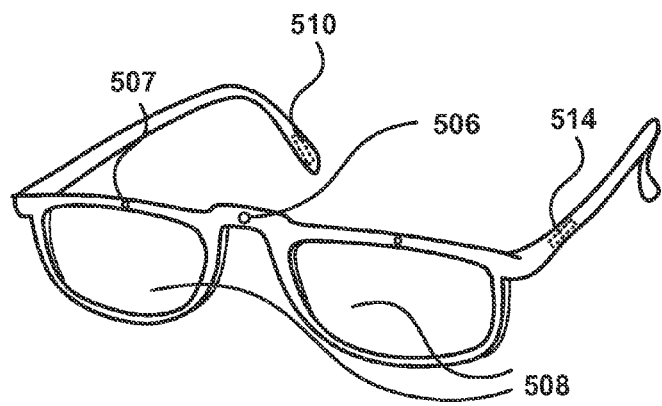

FIG. 5A illustrates an example situation of rendered audiovisual communication for multiple users in accordance with an embodiment. In this example, a first user 502 interacts with users 552, 554, and 556 in a virtual conference room. The perspective 550 of the virtual conference room is from that of the first user 502 of a computing device, such as the one illustrated as computing device 500 in FIG. 5B. The computing device 500 may be in a form factor such as eyeglasses, but can also comprise helmets, goggles, headsets, conventional electronic devices paired with headphones, etc. The computing device 500 can include a display element 508 to enable the user 502 to visualize users 552, 554, and 556 according to various types of renderings, including 2D or 3D. Image data can be displayed directly on the lenses of the glasses 500 in some embodiments. In other embodiments, the computing device 500 can include a light emitting component 507 capable of emitting light against a flat surface that correlates to rendered image data and the lenses 508 can be configured to display the emitted light.

The glasses 500 can have various other components as well, which can be used for different types of functionality. For example, the glasses might have one or more speakers (or earphones) 510 that can enable the glasses to provide data to the user through audio output. In at least some embodiments these audio elements can also include one or more microphones that can enable the user to provide audio commands or input. The example glasses 500 also include one or more communication components 514, which can use any appropriate wireless (or potentially wired) communication technology for communicating with one or more other devices. The technology can include, for example, Bluetooth®, WiFi, RF, and other such wireless communication technologies. The communication component(s) can communicate with another computing device associated with the user, other nearby devices capable of communicating over the same communication channel, other glasses, etc.

In one embodiment, the glasses 500 can be operated in combination with an input device (not shown) to provide the first user with the immersive experience of the virtual conference room. The input device can have at least one camera facing the user, in order to be able to capture images or video of the user. The input device can also include an IR emitter and an IR detector as discussed previously herein to capture depth or distance information. Three-dimensional image information of the first user can be captured by the camera and IR system of the input device. In another embodiment, the first user may only be a passive participant and an input device may not be necessary to provide audiovisual data of the first user. For example, such an embodiment may be advantageous for an application such as presentation of a lecture or sales pitch. In still other embodiments, input elements can be disposed on the output device 500 to provide a portion of the audiovisual data of the first user such as if the model or rig for a user already exists and the rendering of the user can be achieved predominantly by speech recognition.

Figure 6:
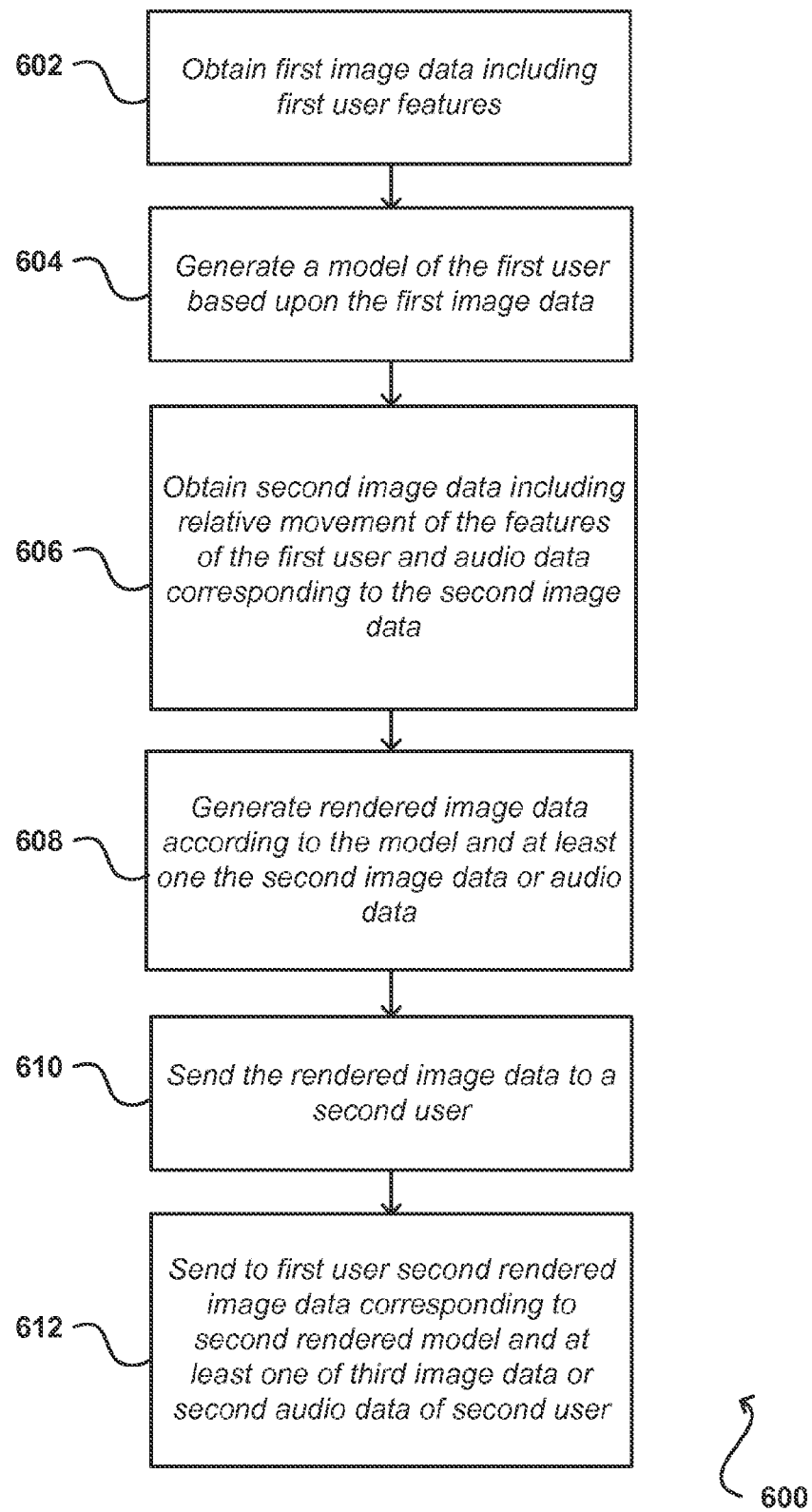
FIG. 6 illustrates an example process for rendered audiovisual communication in accordance with an embodiment.

FIG. 6 illustrates an example process 600 for rendered audiovisual communication that can be used in accordance with various embodiments. It should be understood that, for any process discussed herein, there can be additional, fewer, or alternative steps performed in similar or alternative orders, or in parallel, within the scope of the various embodiments unless otherwise stated. In this example, the process is initiated by obtaining first image data correlating to the features of the user 602. In one embodiment, the user may wish to operate his computing device in a "talking head" mode such that only the user's head, neck, and an upper portion of the user's torso is displayed. Accordingly, the user can obtain the first image data by keeping his head still and scanning the front of his face from ear to ear in a semicircular motion. The user's facial features can be analyzed and stored, such as discussed above in FIGS. 2A-2C and FIGS. 3A-3F. In at least some embodiments, the user can be directed to "train" the model based on common facial expressions such as a neutral expression, a smile, a frown, and various other expressions and emotional states. The user can also be directed to "train" the model by enunciating various words or sounds to generate a phoneme to viseme mapping of various languages as discussed herein. In other embodiments, a system or service can implement machine learning to automatically generate the phoneme to viseme mapping based on usage of the system over time. In addition, other data such as skin texture; hair color and texture; facial feature shapes, colors, and textures; and the like, can be obtained during this process. In another embodiment, the user may want more of his body to be displayed and the user's computing device can assist with the scan of the user's entire body using some of the techniques described above, discussed in FIGS. 4A-4B, or similar approaches. The computing device can be located at a distance and location sufficient to capture one perspective of the user's body, and the computing device can direct the user (such as by voice command) to turn at various angles to capture a 360° perspective of the user's body.

After the first image data has been obtained of the first user, a model of the first user can be generated and/or selected based at least in part upon the first image data 604. For example, a model of the user can be obtained by a device or a remote server system upon recognition of the user if the model has previously been generated or the user may select a previously generated model from among several previously generated models. The model may be stored on the device or stored on the remote server system. In some embodiments, the remote server system may be the same system that renders the image or video data of the user based on the model stored for the user. In various embodiments, the model may be a photorealistic model of the user and can correspond substantially to the physical appearance of the user. In other embodiments, the model may be a stylized model of the user such as a clay animation or cartoon rendering of the user. In still other embodiments, the model may be a fictional avatar or a photorealistic avatar of another entity. The models can comprise 2D image data, 3D image data for 2D display, stereoscopic image data, 3D image data for 3D display, or other formats known in the art. In various embodiments, the format of the model can be dynamically adjusted according to the capabilities of the receiving display device. For example, a system in accordance with such embodiments can broadcast rendered audiovisual information tailored for multiple types of viewing devices. A viewer with a 2D display element can receive rendered data of one of the types of 2D models, a viewer capable of stereoscopic display can receive the stereoscopic image data, and a viewer capable of 3D display can receive rendered data for the 3D model for 3D display. Another approach within the scope of various embodiments is to provide audiovisual data in a standard format and developing software viewers for rendering the standard format according to the display capabilities of supported devices. Various embodiments also enable a user to modify the appearance of the model, such as by changing/removing an article of clothing or a characteristic of the model such as hairstyle, eye color, wrinkles, etc. In at least some systems or services of various embodiments, the model can be saved and reused for other audiovisual conferencing sessions.

When the user wishes to engage in rendered audiovisual communication, second image data corresponding to the various features, such as facial features or other bodily features, of the user and audio data corresponding to the second image data can be obtained 606. In various embodiments, the second image data can be obtained using similar approaches discussed in step 602 and FIGS. 2A-2C and FIGS. 3A-3F. However, the second image data may comprise a much smaller amount of data with respect to the first image data obtained during step 602 because much of the user-specific data has already been previously analyzed and modeled. For example, second image data representing motion of the user's eye can be analyzed and represented as coordinates of virtual "boxes" (e.g., FIG. 3A) or one or more feature points (e.g., FIG. 3B) rather than a complete pixel map of the user's eye as discussed previously herein. The second image data can be captured at various intervals. In one embodiment, the second image data can be captured upon every frame of the frame per second (fps) rate of the image capturing component used to acquire the second image data, such as 30 fps. In other embodiments, the second image data can be captured at intervals that are further apart and image morphing techniques can be used to provide more seamless transitions between these longer intervals.

As only relative motion of a subset of features may be acquired, image data can be rendered from the model 608 according to the tracked relative motion. In at least some embodiments, speech can also be synthesized as discussed throughout herein. In such embodiments, image data may also be rendered to sync with the synthesized audio data for video conferencing. Rendering the visual information can also include tasks such as framing a suitable perspective of the user, adjusting background elements, adjusting lighting conditions, adjusting the appearance of the model, shading, texture mapping, bump-mapping, shadowing, reflection, transparency, translucency, refraction, diffraction, etc. For instance, the user may be working from home on a certain day when he receives a request to video conference with a client. In such a situation, the user can specify a different background, such as the user's office, instead of displaying the user's home when the user video conferences with his client. As another example, out of privacy and/or security concerns, the user may prefer to have a virtual background displayed during video conferencing instead of the actual background captured by the user device's camera. In at least some embodiments, rendering of the image information can also include image stabilization techniques to account for shaking or jiggering and other such errors.

Figure 9:
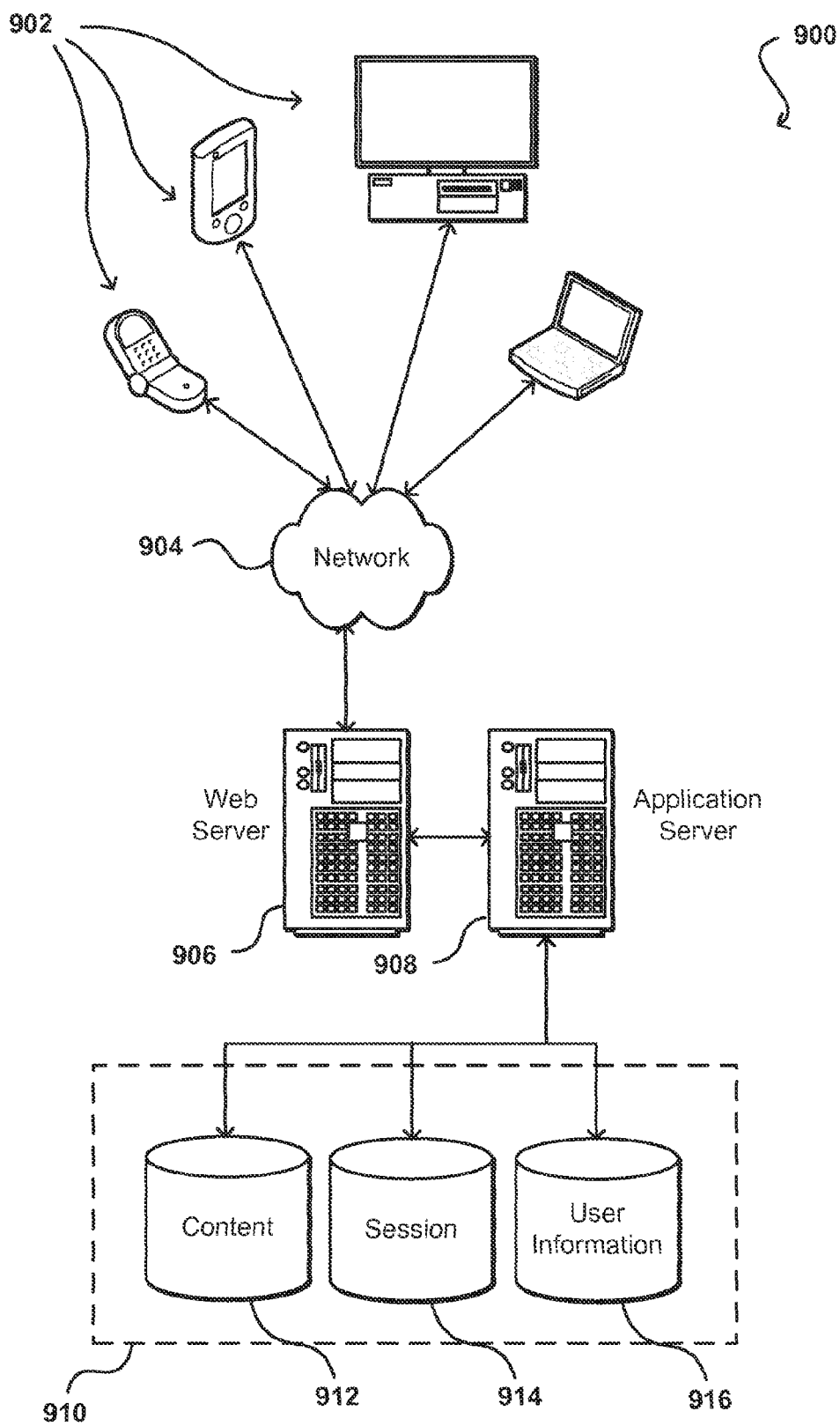
FIG. 9 illustrates an example environment in which various embodiments can be implemented.

In certain embodiments, the processing for rendering or morphing of user states can be offloaded to a separate system as discussed in further detail below with respect to FIG. 9. In other embodiments, the processing for the rendering of image data based on the model of the user and synthesis of audio data can be performed by the user device and/or one or more receiving devices. The rendered image data and synthesized audio data can be aggregated for streaming to one or more second users 610. The one or more second users can likewise perform similar steps to stream their audiovisual information to the user 612.

Figure 7:
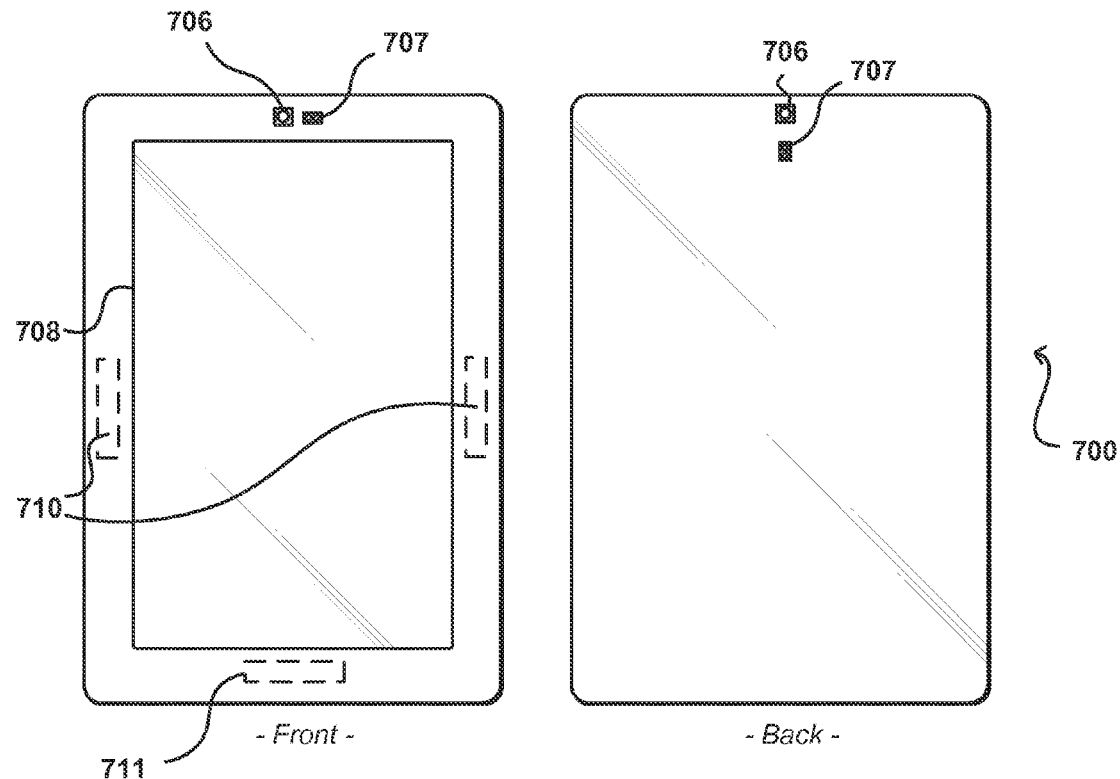
FIG. 7 illustrates an example of a computing device that can be used in accordance with various embodiments.

FIG. 7 illustrates an example computing device 700 that can be used to perform approaches described in accordance with various embodiments. In this example, the device has a conventional image capturing component 706 on each of a same and opposite side of the device as a display element 708, and enabling the device to capture images in accordance with various embodiments. The computing device also includes a depth imaging system 707 on each side of the device, such as an IR system including one or more IR emitters and one or more IR sensors to determine depth or distance information during image capturing according to certain embodiments. The computing device includes audio output elements 710, such as speakers, on each side of the front face of the device to provide audio throughput and one or more audio input elements 711, such as a microphone, to receive audio input from a user.

Figure 8:
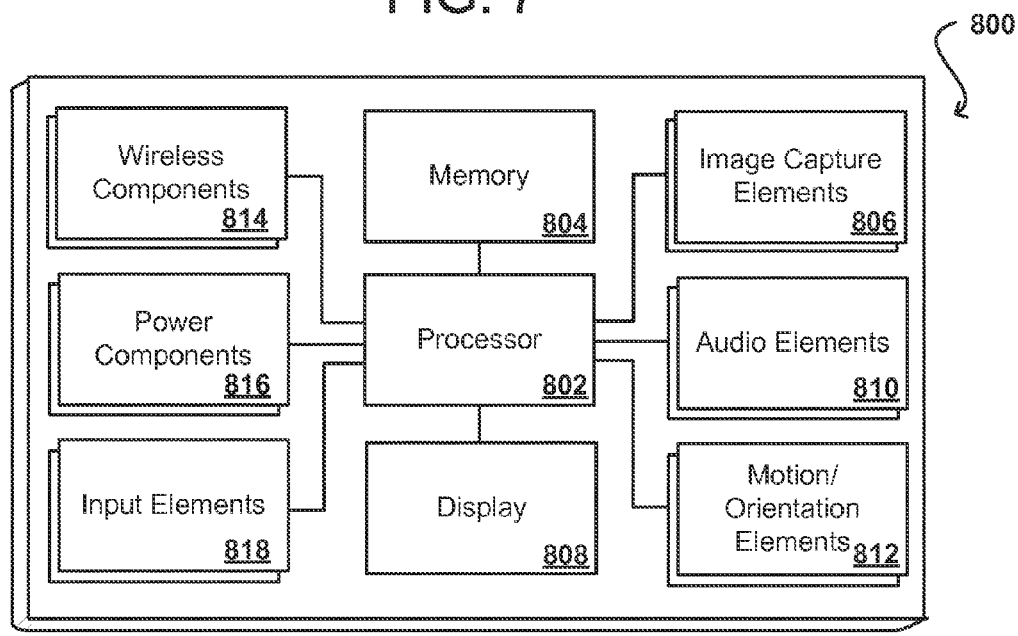
FIG. 8 illustrates an example configuration of components of a computing device such as that illustrated in FIG. 7.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc.

The device typically will include some type of display element 808, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. As discussed above, the device in many embodiments will include one or more image capture elements 806, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. A video capture element can include, or be based at least in part upon any appropriate technology, such as a CCD or CMOS image capture element having a sufficient resolution, focal range, viewable area, to capture an image of the user when the user is operating the device.

The device, in many embodiments, will include at least one audio element 810, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one or more motion and/or orientation elements 812 that provide information such as a position, direction, motion, or orientation of the device. These one or more motion and/or orientation determining elements 812 can include, for example, accelerometers, inertial sensors, electronic gyroscopes, electronic compasses, and GPS elements.

The example device can also include one or more additional input devices 818 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The example device also includes one or more wireless components 814 operable to communicate with one or more computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 816 known in the art for providing power to a portable computing device, which can include capacitive charging elements for use with a power pad or similar device as discussed elsewhere herein. The example device also can include at least one touch and/or pressure sensitive element 818, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claim.

What is claimed is:

1. A computer-implemented method, comprising:
    capturing, using a first computing device, image data including a representation of a face during a period of time;
    capturing, using the first computing device, audio data during the period of time;
    obtaining a model corresponding to the face, the model associating a first state to first facial image data that represents a first facial expression and associating a phoneme to second facial image data that represents a second facial expression;
    determining that a portion of the image data, captured within a first period of time, corresponds to the first state;
    determining that a portion of the audio data, captured within a second period of time, corresponds to the phoneme;
    generating rendered image data based at least in part on the first facial image data, the second facial image data, and the model; and
    sending the rendered image data to a second computing device.

2. The computer-implemented method of claim 1, further comprising:
    capturing the first facial image data;
    storing, for the model, first data for associating the first state to the first facial image data;
    capturing the second facial image data and
    storing, for the model, second data for associating the phoneme to the second facial image data.

3. The computer-implemented method of claim 2, wherein the first state represents a neutral user state, and the method further comprises:
    generating first blended image data by blending the first facial image data and the second facial image data over a duration,
    wherein the rendered image data is generated further based at least in part on the first blended image data.

4. The computer-implemented method of claim 1, wherein the model is a previously generated model.

5. The computer-implemented method of claim 1, further comprising:
    capturing, using the first computing device, background image data,
    wherein the rendered image data is generated further based at least in part on the background image data.

6. The computer-implemented method of claim 1, wherein the audio data includes first speech data corresponding to first speech of a first language, and the method further comprises:
    generating second speech data corresponding to a translation of the first speech of the first language to second speech of a second language; and
    sending the second speech data to the second computing device within a duration the rendered image data is sent to the second computing device.

7. The computer-implemented method of claim 1, wherein the audio data includes speech data corresponding to speech, and the method further comprises:
    generating text data corresponding to a conversion of the speech to text; and
    sending the text data to the second computing device within a duration the rendered image data is sent to the second computing device.

8. The computer-implemented method of claim 1, further comprising:

capturing, using the second computing device, second image data including a second representation of a second face during a second period of time;

capturing, using the second computing device, second audio data during the second period of time;

obtaining a second model corresponding to the second face;

generating second rendered image data based at least in part on the second model and at least one of the second image data or the second audio data; and sending the second rendered image data to the first computing device.

9. The computer-implemented method of claim 1, further comprising:

determining a display capability of the second computing device, wherein the rendered image data corresponds to a format that is supported by the display capability of the second computing device.

10. A computing device, comprising:

a processor;

a camera; and a microphone; and memory including instructions that, upon being executed by the processor, cause the computing device to:

capture, using the camera, image data including a representation of a face during a period of time;

capture, using the microphone, audio data during the period of time;

cause a model corresponding to the face to be obtained, the model associating a first state to first facial image data that represents a first facial expression and associating a phoneme to second facial image data that represents a second facial expression;

determine that a portion of the image data, captured within a first period of time, corresponds to the first state;

determine that a portion of the audio data, captured within a second period of time, corresponds to the phoneme;

cause rendered image data to be generated based at least in part on the first facial image data, the second facial image data, and the model; and cause the rendered image data to be sent to a second computing device.

11. The computing device of claim 10, wherein the instructions upon being executed further cause the computing device to:

capture the first facial image data;

store, for the model, first data for associating the first state to the first facial image data;

capture the second facial image data; and store, for the model, second data for associating the phoneme to the second facial image data.

12. The computing device of claim 10, wherein the instructions upon being executed further cause the computing device to:

send information corresponding to the image data and the audio data to a remote server, wherein the model is obtained by the remote server, the rendered image data is generated by the remote server, and the rendered image data is sent to the second computing device by the remote server.

13. The computing device of claim 10, wherein the model is obtained by the computing device, the rendered image data is generated by the computing device, and the rendered image data is sent to the second computing device by the computing device.

14. One or more non-transitory computer-readable storage mediums storing instructions that, upon being executed by one or more processors, cause the one or more processors to:

capture, using a first computing device, image data including a representation of a face during a first period of time;

capture, using the first computing device, first speech data corresponding to first speech of a first language during the first period of time;

obtain a model corresponding to the face based at least in part on at least one of the image data or the first speech data;

generate second speech data corresponding to a translation of the first speech of the first language to second speech of a second language;

generate rendered image data corresponding to the face based at least in part on the model and at least one of the image data or the second speech data;

send the rendered image data to a second computing device during a second period of time; and send the second speech data to the second computing device during the second period of time.

15. The one or more non-transitory computer-readable storage mediums of claim 14, wherein the instructions further cause the one or more processors to:

capture, using the first computing device, background image data, wherein the rendered image data is generated further based at least in part on the background image data.

16. The one or more non-transitory computer-readable storage mediums of claim 14, wherein the instructions upon being executed further cause the one or more processors to:

generate text data corresponding to a conversion of at least one of the first speech or the second speech to text; and send the text data to the second computing device during the second period of time.

17. The one or more non-transitory computer-readable storage mediums of claim 14, wherein the instructions upon being executed further cause the one or more processors to:

determine a display capability of the second computing device, wherein the rendered image data corresponds to a format that is supported by the display capability of the second computing device.

* * * * *